United States Patent [19]

Amtmann

[11] 4,322,268
[45] Mar. 30, 1982

[54] COOLING SYSTEM FOR A NUCLEAR REACTOR

[75] Inventor: Hans H. Amtmann, Rancho Santa Fe, Calif.

[73] Assignee: The United States of America as represented by the United States Department of Energy, Washington, D.C.

[21] Appl. No.: 892,821

[22] Filed: Apr. 3, 1978

[51] Int. Cl.³ .............................................. G21C 19/28
[52] U.S. Cl. .................................. 376/298; 376/299; 376/394
[58] Field of Search .................. 176/37, 38, 60, 65, 176/61; 137/876

[56] References Cited

U.S. PATENT DOCUMENTS

| | | | |
|---|---|---|---|
| 850,762 | 4/1907 | Kolla | 137/876 |
| 3,127,322 | 3/1964 | Dodd | 176/60 |
| 3,161,572 | 12/1964 | Kagi | 176/60 |
| 3,180,798 | 4/1965 | Brunner | 176/60 |
| 3,802,994 | 4/1974 | Forster et al. | 176/65 |
| 3,937,652 | 2/1976 | George | 176/60 |
| 4,025,387 | 5/1977 | Haferkamp et al. | 176/60 |
| 4,051,892 | 10/1977 | Reinsch | 176/60 |
| 4,057,465 | 11/1977 | Thompson et al. | 176/60 |
| 4,064,001 | 12/1977 | Duncan | 176/60 |
| 4,113,559 | 9/1978 | Schweiger | 176/58 PB |
| 4,113,561 | 9/1978 | Fidler et al. | 176/38 |
| 4,118,276 | 10/1978 | Hodzic et al. | 176/60 |

*Primary Examiner*—S. A. Cangialosi

[57] ABSTRACT

A cooling system for a gas-cooled nuclear reactor is disclosed which includes at least one primary cooling loop adapted to pass coolant gas from the reactor core and an associated steam generator through a duct system having a main circulator therein, and at least one auxiliary cooling loop having communication with the reactor core and adapted to selectively pass coolant gas through an auxiliary heat exchanger and circulator. The main and auxiliary circulators are installed in a common vertical cavity in the reactor vessel, and a common return duct communicates with the reactor core and intersects the common cavity at a junction at which is located a flow diverter valve operative to effect coolant flow through either the primary or auxiliary cooling loops.

7 Claims, 7 Drawing Figures

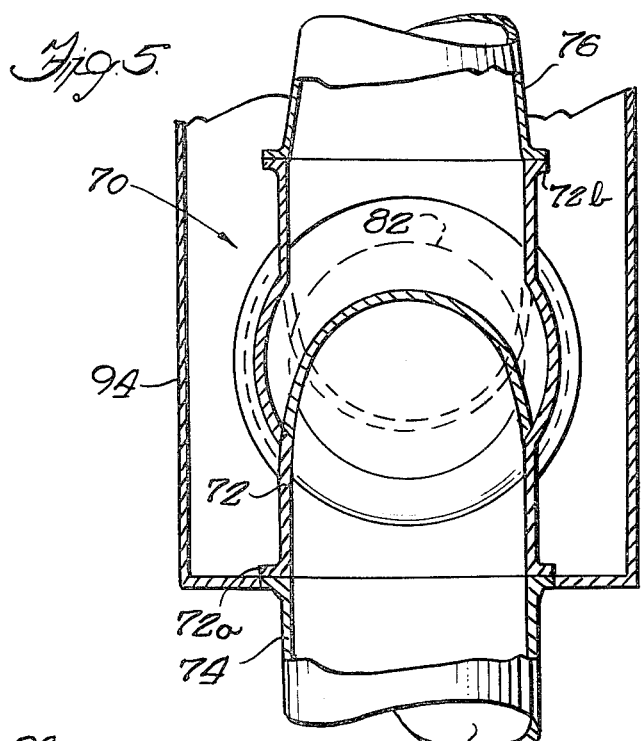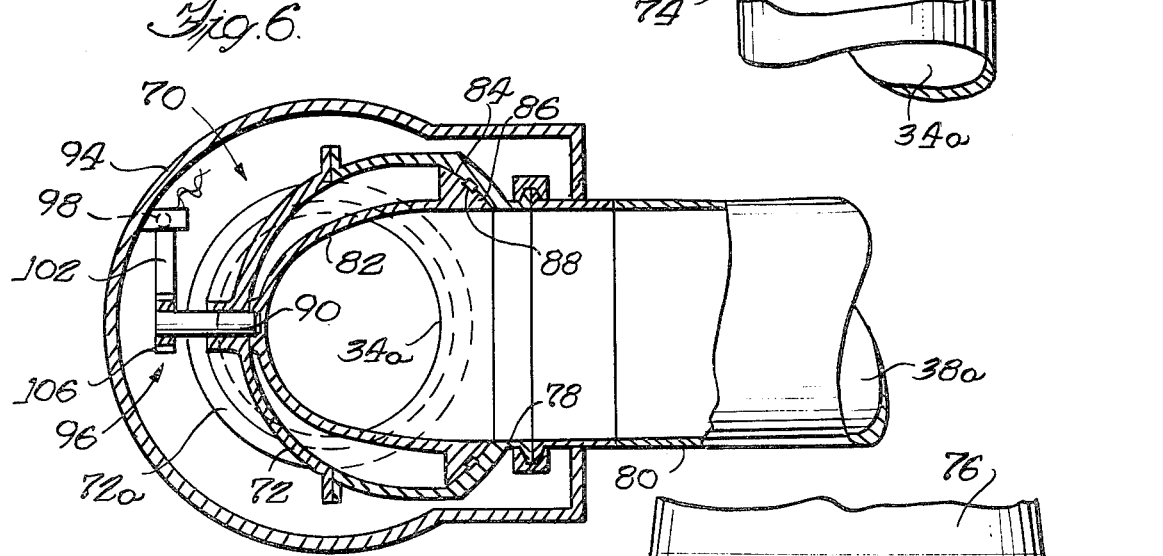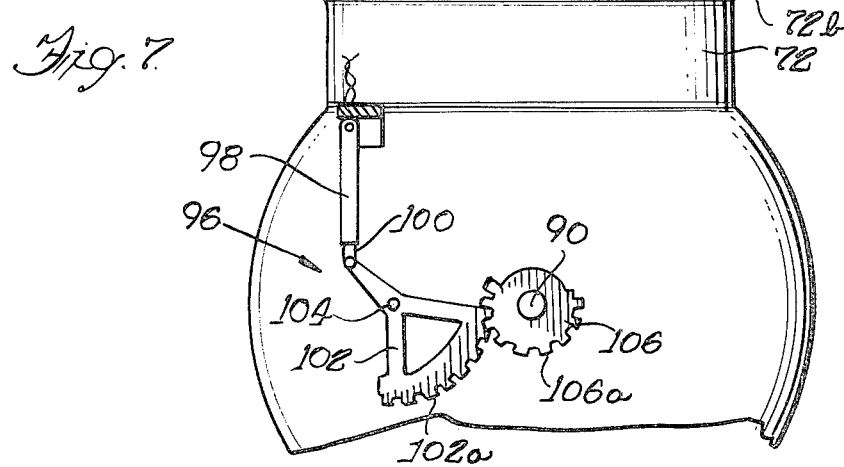

COOLING SYSTEM FOR A NUCLEAR REACTOR

The present invention relates generally to heat exchanger cooling systems, and more particularly to a novel cooling system for a gas-cooled nuclear reactor wherein primary and auxiliary cooling loops are provided with a common flow return duct to return coolant to the reactor core, and including a flow diverter common to both the primary and auxiliary coolant loops and selectively operable to control coolant flow through a selected one of the primary or auxiliary coolant loops while isolating the other of the loops.

It is a conventional practice in gas-cooled high temperature nuclear reactors to circulate a coolant gas, such as helium, within the power loop, i.e., a closed loop containing the reactor core and a heat exchanger in the form of a steam or vapor generator, through a ducting system by means of main or primary circulators. For emergency cooling of the gas coolant, as in the case of a malfunction or shutdown of the steam generator, independent auxiliary cooling loops are frequently employed consisting of auxiliary circulators, auxiliary heat exchangers and a ducting system for the auxiliary cooling loop which is independent of the primary cooling loop. The primary and auxiliary circulators are generally installed in different cavities or penetrations within the reactor vessel. While such systems have proven capable of providing sufficient primary and emergency auxiliary cooling for the heated coolant gas after it is passed through the active reactor core, such independent cooling loops add substantially to the overall cost of a nuclear reactor power system.

The present invention has as one of its primary objects the provision of a novel cooling system for a gas-cooled nuclear reactor which employs primary and emergency auxiliary cooling loops sharing common cavity, return duct and diverter valve means resulting in significant economic advantages over prior gas-cooled nuclear reactor cooling systems.

A more specific object of the present invention is to provide a novel cooling system for a gas-cooled nuclear reactor which employs primary and emergency auxiliary cooling loops having a common flow return duct to the reactor core and a single flow diverter valve located at the junction of the common return duct with the primary and auxiliary cooling loops so as to allow selective isolation of one of the loops while facilitating coolant flow through the other of the loops.

Still another object of the present invention is to provide a novel cooling system for a gas-cooled nuclear reactor wherein primary and emergency auxiliary cooling loops include a common vertical cavity in a prestressed concrete reactor vessel, the primary and auxiliary cooling loops being connected to a common coolant return duct at a junction in which is disposed a diverter valve normally isolating the coolant within the primary coolant loop but being selectively operable to divert flow of coolant gas from the reactor core to the emergency auxiliary cooling loop while isolating the primary cooling loop.

A feature of the present invention lies in the provision of primary and emergency auxiliary cooling loops in a gas-cooled nuclear reactor wherein the loops include a common vertical cavity housing both a circulator for the primary cooling loop and a circulator for the emergency auxiliary cooling loop. A single return duct common to the primary and auxiliary loops houses a flow diverter valve operative to selectively control coolant flow through the primary or auxiliary cooling loops and their associated circulators whereby to eliminate the need for an isolation valve normally located at the circulator associated with the emergency auxiliary cooling loop.

Another feature of the gas-cooled nuclear reactor cooling system in accordance with the present invention lies in the provision of a novel diverter valve located at the junction of a common return duct with a cavity in the reactor vessel which houses both the primary and auxiliary circulators, the diverter valve being operable by means externally of the reactor vessel to selectively isolate the auxiliary cooling loop from the primary coolant loop.

Further objects and advantages of the present invention, together with the organization and manner of operation thereof, will become apparent from the following detailed description of the invention when taken in connection with the accompanying drawings wherein like reference numerals designate like elements throughout the several views, and wherein:

FIG. 5 is a fragmentary sectional view taken substantially along line 5—5 of FIG. 4 looking in the direction of the arrows;

FIG. 6 is a fragmentary sectional view taken substantially along the line 6—6 of FIG. 4, looking in the direction of the arrows; and FIG. 7 is a fragmentary view taken along line 7—7 of FIG. 5 and illustrating the control for the diverter valve of FIGS. 4-6.

Figure 1:
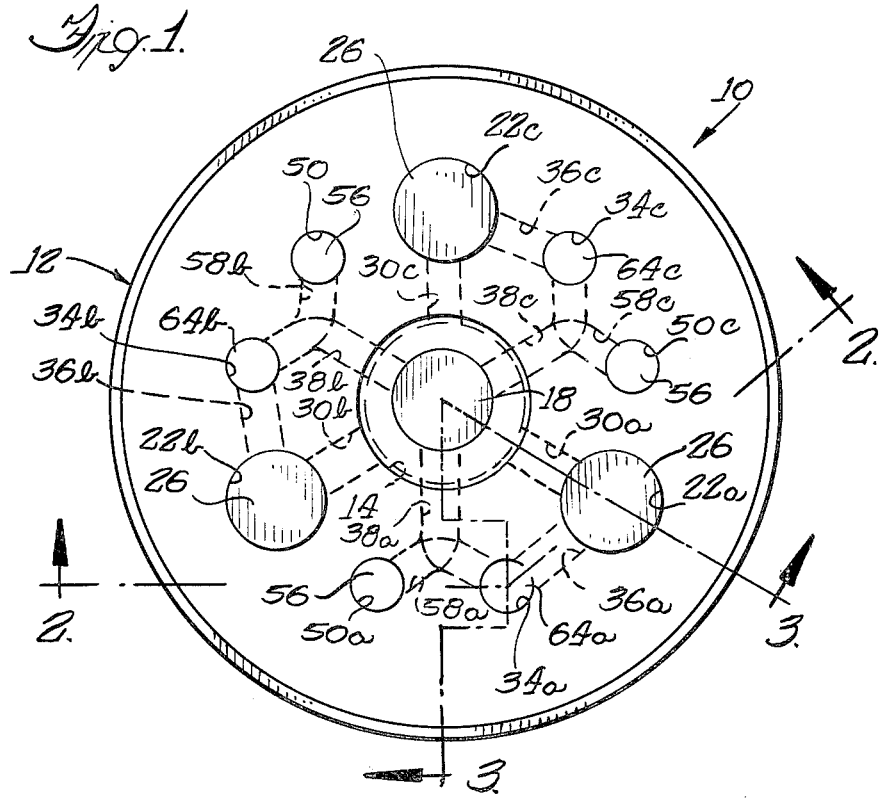
FIG. 1 is a fragmentary schematic plan view of a gas-cooled nuclear reactor employing a cooling system in accordance with the present invention.
Figure 2:
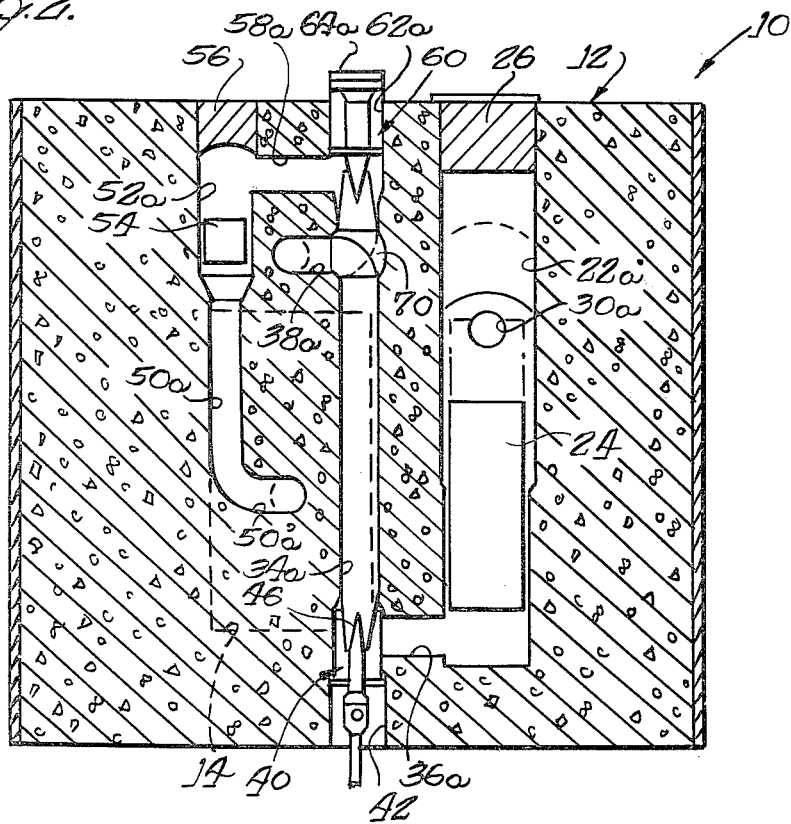
FIG. 2 is a fragmentary vertical sectional view of the reactor of FIG. 1, taken substantially along line 2—2 of FIG. 1 and looking in the direction of the arrows.
Figure 3:
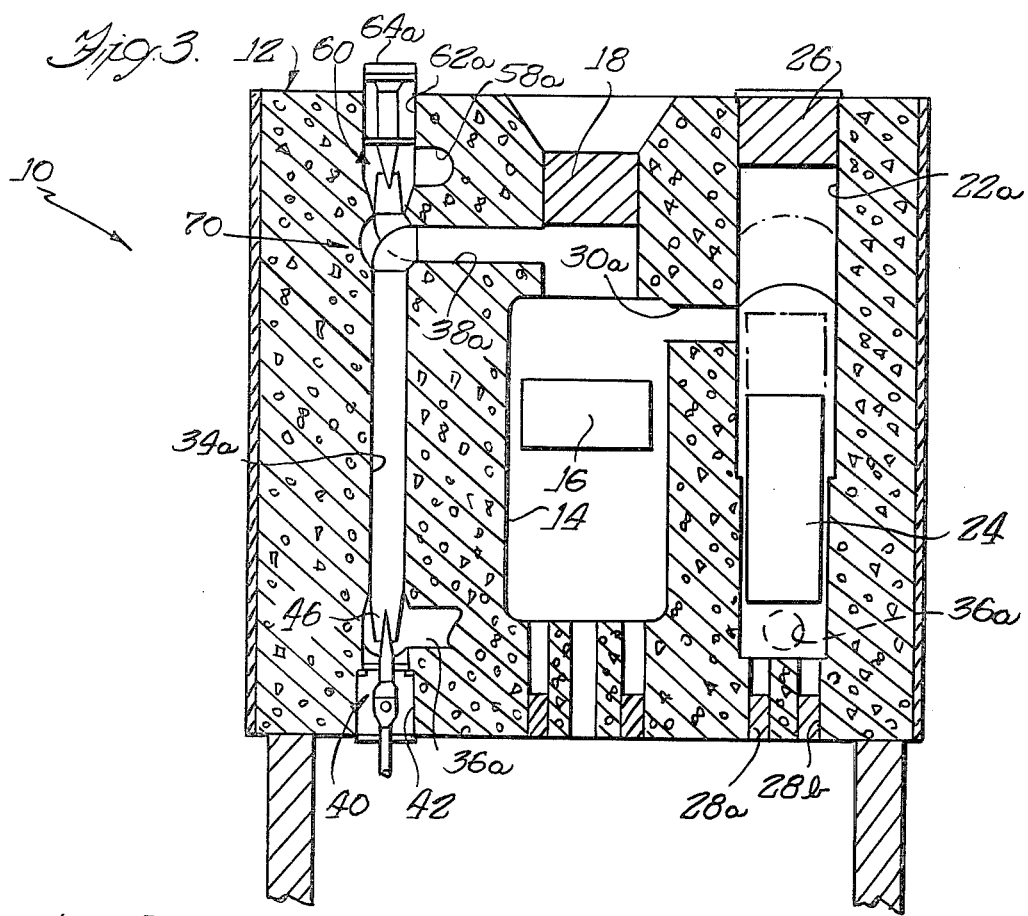
FIG. 3 is a fragmentary vertical sectional view taken substantially along line 3—3 of FIG. 1, looking in the direction of the arrows.

Referring now to the drawings, and in particular to FIGS. 1-3, a gas-cooled, high temperature nuclear reactor embodying a cooling system in accordance with the present invention is indicated generally at 10. The nuclear reactor 10 is illustrated schematically as including a prestressed concrete reactor vessel 12 having an internal reactor core chamber or cavity 14 in which is mounted a reactor core 16 of known design suitable for use in a relatively high temperature gas-cooled nuclear reactor. A plug 18 is releasably mounted within the upper end of the chamber 14 to provide access to the reactor core 16 for servicing and replacement of fuel rods or other components within the reactor core.

As best seen in FIG. 1, the illustrated high temperature gas-cooled nuclear reactor 10 has three steam generator chambers or penetrations 22a, b and c formed therein equidistantly circumferentially spaced about the center axis of the reactor core chamber 14. Each steam generator chamber or penetration houses a conventional steam generator 24 (FIG. 2) and has its upper end closed by a suitable closure 26, the lower end of each penetration 22a-c being provided with secondary penetrations 28a and 28b (FIG. 3) to receive flow conduits (not shown) which carry water to and superheated steam from each steam generator, as is known. Each chamber 22a, b and c communicates with the reactor core chamber 14 through a corresponding hot gas exhaust duct 30a, b and c, and also communicates with an associated vertical cylindrical chamber or cavity 34a, b and c, respectively, through a corresponding flow duct 36a, b and c which intersects its associated steam generator chamber adjacent the lower end thereof, as best seen in FIG. 2.

Each of the vertical cavities 34a-c serves as a common vertical cavity for primary and emergency auxiliary cooling associated with each steam generator and the reactor core 16 in the nuclear reactor 10. To this end, each cavity 34a, b and c communicates with the reactor core chamber 14 through a coolant flow return duct 38a, b and c, respectively, which intersects its associated cavity 34a, b or c generally adjacent its upper end, as best seen in FIGS. 2 and 3. The hot gas exhaust ducts 30a-c and associated steam generator chambers 22a-c, flow ducts 36a-c, vertical cavities 34a-c and coolant return ducts 38a-c cooperate to define primary or "main" cooling loops having communication with the reactor core chamber 14. The primary cooling loops facilitate circulation of a suitable gaseous coolant, such as helium, from the reactor core chamber 14 to the respective steam generators 24 where the heated coolant gas heats water within the steam generators after which the reduced temperature coolant is returned to the reactor core chamber through the cavities 34a-c and return ducts 38a-c.

To effect circulation of gaseous coolant through the primary cooling loops, a helium circulator 40 of known design is mounted within a penetration 42 formed at the lower end of each of the respective vertical cavities 34a-c. Each circulator 40 is mounted so that gaseous helium coolant from the associated steam generator chambers 22a-c enters the plenum above the bellmouth 46 of each circulator and is caused to flow upwardly through the associated vertical cavities 34a-c and into the reactor core chamber 14 through the return ducts 38a-c.

In accordance with an important feature of the present invention, an emergency auxiliary cooling loop is operatively associated with each of the primary cooling loops so as to utilize the common vertical cavities 34a-c and the common coolant return ducts 38a-c. As will be described more fully hereinafter, circulators for the emergency auxiliary cooling loops are mounted at the upper ends of the common vertical cavities 34a-c, thereby eliminating the need for separate cavities or penetrations within the reactor housing 12 to house the circulators for the emergency auxiliary cooling loops.

The auxiliary or emergency cooling loops include ducts 50a-c which are formed in the reactor housing 12 so as to extend generally vertically downwardly from the top of the reactor housing, and have communication with the reactor core chamber 14 through lower curved end portions 50'a-c, as best seen in FIG. 2. Considering the auxiliary cooling duct 50a as being representative of the auxiliary coolant ducts 50a-c, the upper end of the cooling duct 50a is enlarged at 52a and has a suitable conventional heat exchanger 54 mounted therein to effect auxiliary cooling of the gaseous coolant when received from the reactor core chamber 14. The upper end of each auxiliary cooling duct 50a-c is closed by a suitable closure 56.

Each auxiliary cooling duct 50a-c is connected through an associated horizontal cross-over duct 58a-c, respectively, to a corresponding vertical cavity 34a-c common with the primary cooling loops. In this manner, the cross-over ducts 58a-c have communication with the common coolant flow return ducts 38a-c to complete the emergency auxiliary cooling loops back to the reactor core chamber 14. An auxiliary circulator 60 is mounted within an enlarged upper end 62a-c, respectively, of each of the common vertical cavities 34a-c in substantially axial alignment with the lower primary circulators 40. The auxiliary circulators 60, which may be identical to the primary circulators 40, are adapted to effect selective flow of gaseous coolant through the emergency auxiliary cooling loops when energized, as will become more apparent hereinbelow. The upper ends 62a-c of the cavities 34a-c are closed by suitable steel closures 64a-c. By mounting the primary and auxiliary circulators 40 and 60, respectively, at the lower and upper ends of the common vertical cavities 34a-c, separate cavities for the auxiliary circulators are eliminated with resulting substantial cost savings in construction of the gas-cooled nuclear reactor 10.

To facilitate selective operation of the emergency auxiliary cooling loops, such as in a situation where a problem may exist within one or more of the steam generators 22 requiring shutdown of its corresponding primary cooling loops, a flow diverter valve, indicated generally at 70, is located within each junction defined at the intersection of each flow return duct 38a, b and c with its corresponding common vertical cavity 34a-c. With particular reference to FIGS. 4–7, taken in conjunction with FIGS. 2 and 3, each flow diverter valve 70 includes a valve housing 72 connected through an annular flange 72a to the upper end of a tubular liner 74 formed within the prestressed concrete reactor vessel 12 and defining the associated common vertical cavity 34a-c. The annular flange 72a defines an inlet opening into the valve housing 72 from the associated primary cooling loop. The diverter valve housing 72 has an upwardly facing annular flange 72b similar to the flange 72a and on which is mounted the lower end of a bellmouth 76 forming a part of the associated auxiliary circulator 60. Each bellmouth 76 defines an internal plenum which receives gaseous helium coolant from the associated cross-over duct 58a-c during operation of the auxiliary cooling loops. Each diverter valve housing 72 also has an outlet opening defined by an annular wall 78 adapted for connection to a tubular flow duct 80 disposed within the concrete reactor vessel 12 to establish the corresponding coolant flow return duct 38a.

A diverter valve plate 82 having generally the shape of a curved duct having an inner diameter equal to the inner diameter of duct 38a is supported within each valve housing 72 for rotation about an axis coincident with the axis of the associated flow return duct 38a. Each diverter plate 82 is movable between a first mode or position, as represented in solid lines in FIG. 4, operative to isolate the corresponding auxiliary cooling loop while facilitating flow of gaseous coolant through the associated primary cooling loop, and a second mode or position disposed approximately 180° about the axis of the corresponding duct 38a, as shown in phantom in FIG. 4, wherein the diverter plate isolates the primary cooling loop and facilitates flow of gaseous coolant through the emergency auxiliary cooling loop. To this end, the diverter valve plate 82 has an arcuate outer surface 84 which has sliding engagement with a suitably configured annular surface 86 formed in the diverter valve housing 72. The surfaces 84 and 86 comprise portions of a spherical surface. Preferably, an annular bearing 88 is mounted within mutually cooperating annular grooves in the sliding surfaces 84 and 86 to facilitate rotation of the valve plate 82.

To effect selective rotation of the diverter valve plates 82 between their first and second operating positions, a control shaft 90 is secured to each valve plate at its axis of rotation and is journaled within the associated housing 72 so that rotation of the control shaft rotates the associated valve plate about the axis of its corresponding return duct 38a. Each diverter valve housing 72 is mounted within an outer casing or housing 94 which also houses control means, indicated generally at 96, for controlling rotation of the associated control shaft 90 and valve plate 82. In the illustrated embodiment, each control means 96 includes a linear actuator in the form of a hydraulic or pneumatic cylinder or ram 98 having an extendible piston rod 100 pivotally connected to a gear segment actuator 102 rotatably mounted on the housing 94 through a stub shaft 104. The actuator 102 has peripheral teeth 102a adapted for engagement with complementary teeth 106a on a spur gear segment 106 mounted on the associated control shaft 90. In this manner, selective actuation of the linear actuators 98 is operative to control rotation of the associated diverter valve plates 82 between their operating positions to control flow of gaseous coolant through either the primary or auxiliary cooling loops. The hydraulic or pneumatic lines (not shown) for each operating ram 98 may be passed through suitable sealed bores in the corresponding closures 64a-c for connection to suitable sources of fluid pressure and control valve mechanisms (not shown).

Figure 4:
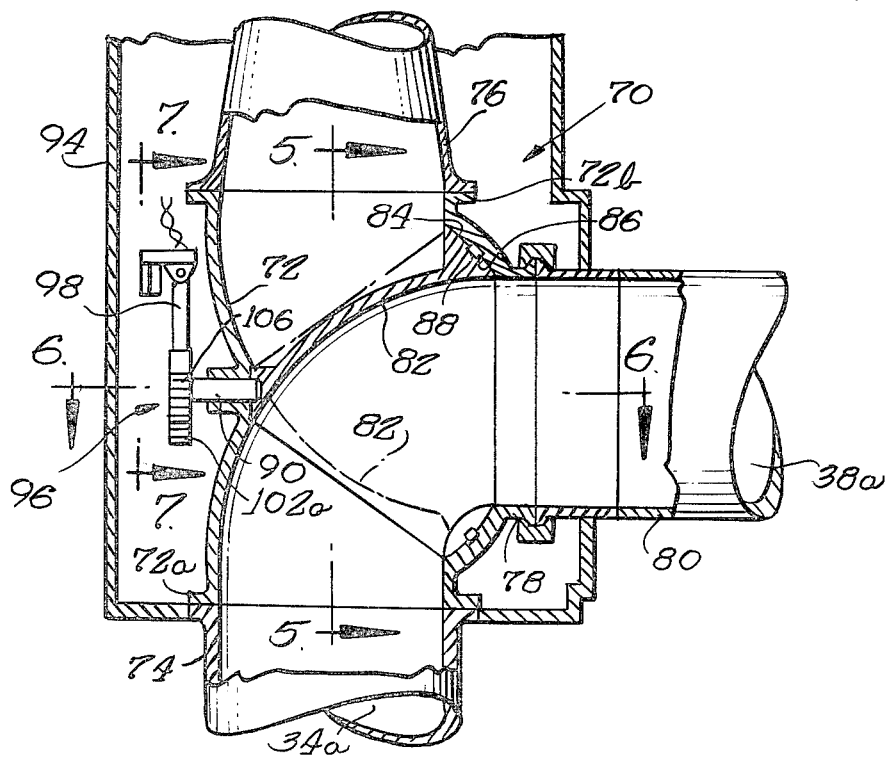
FIG. 4 is an enlarged fragmentary view, partly in elevation and partly in section, illustrating the junction of one pair of primary and auxiliary cooling drops with a common return duct, with a flow diverter valve mounted internally of the junction.

In the operation of the gas-cooled nuclear reactor 10, gaseous coolant, such as helium, is normally passed at a high temperature from the reactor core chamber 14 to the steam generator chambers 22 where heat exchange is effected from the gaseous coolant to the water within the steam generator, and from which the gaseous coolant is returned to the reactor core through the primary cooling loops. In this mode of operation, the diverter valve plates 82 are disposed in positions as shown in solid lines in FIG. 4 isolating the auxiliary or emergency cooling loops so as to prevent coolant flow therethrough. When auxiliary or emergency cooling is necessary, such as in the case of a flow blockage or restriction or other heat exchange problem within one of the heat exchanger chambers 22, one or more of the diverter valve plates 82 may be readily rotated through actuation of its associated linear actuator 98 to a position isolating the corresponding primary cooling loop while facilitating flow of the gaseous coolant through the corresponding auxiliary cooling loop wherein the temperature of the coolant is reduced by the auxiliary heat exchanger 54 and caused to return to the reactor core chamber 14 by the corresponding auxiliary circulator 60.

Thus, it is seen that in accordance with the present invention a cooling system for a gas cooled nuclear reactor is provided which employs both primary and auxiliary cooling loops having common cavities or penetrations within the reactor vessel to receive both primary and auxiliary coolant circulators. The primary and auxiliary cooling loops share common flow return ducts to the reactor core chamber so that a single diverter valve having association with each pair of primary and auxiliary cooling loops is operative to selectively control coolant flow through either the associated primary or emergency auxiliary cooling loop. By providing common cavities or penetrations for the primary and auxiliary circulators, and by providing a common flow return duct and a common diverter valve for each pair of primary and auxiliary cooling loops, substantial reductions in manufacturing costs may be realized without sacrificing operating efficiency.

While a preferred embodiment of the present invention has been illustrated and described, it will be understood to those skilled in the art that changes and modifications may be made therein without departing from the invention in its broader aspects.

Various features of the invention are defined in the following claims.

What is claimed is:

1. In a gas-cooled nuclear reactor having a reactor vessel defining a reactor core, at least one primary cooling loop including a primary flow conduit communicating with said core and having primary circulator means adapted to effect flow of coolant through said core, and at least one auxiliary cooling loop including an auxiliary flow conduit communicating with said core and having auxiliary circulator means selectively operable to effect flow of coolant through said core, the improvement wherein said primary and auxiliary flow conduits are axially aligned and defined by a common penetration in said reactor vessel, and including a common flow return duct communicating with said core and intersecting said common penetration to form a common junction with said primary and auxiliary flow conduits so that coolant flow through either of said primary and auxiliary flow conduits is returned to said core through said common flow return duct, said primary and auxiliary circulator means being mounted within said common penetration so as to facilitate selective circulation of flow through said primary and auxiliary cooling loops, and flow diverter means located within said common junction and adapted for selective operation between a first mode operative to effect coolant circulation through only said primary cooling loop and a second mode operative to effect coolant circulation through only said auxiliary cooling loop.

2. The combination as defined in claim 1 wherein said flow diverter means includes a diverter plate moveable between first and second positions to establish said first and second modes of operation.

3. The combination as defined in claim 1 wherein said flow diverter means comprises a flow diverter valve mounted within the reactor at said common junction, said diverter valve including a diverter valve plate rotatably mounted within said common junction for movement between a first position facilitating flow of coolant from said core through said primary cooling loop while isolating said auxiliary cooling loop to prevent flow therethrough, and a second position facilitating flow of coolant from said core through said auxiliary cooling loop while isolating said primary coolant loop to prevent flow therethrough.

4. The combination as defined in claim 3 wherein said diverter valve plate is mounted for rotation about an axis coincident with the axis of said common flow return duct.

5. The combination as defined in claim 4 including linear actuator means operatively associated with said diverter valve plate for effecting selective movement thereof between its said first and second positions.

6. The combination as defined in claim 4 including an actuating shaft secured to said diverter valve plate coaxially with its axis of rotation, and actuator means operatively associated with said actuating shaft for effecting selective rotation of said diverter valve plate through approximately 180 degrees rotation between said first and second positions.

7. The combination of claim 6 wherein said diverter valve plate has a configuration approximating one-half a quarter segment of a sphere.

* * * * *